United States Patent [19]
Worley et al.

[11] Patent Number: 5,640,449
[45] Date of Patent: Jun. 17, 1997

[54] COMMUNICATIONS DEVICE TO ESTABLISH CALL IN ISDN SYSTEM

[75] Inventors: Barry John Worley, Southampton; Steven Price, Overton; David John White, Southampton, all of United Kingdom

[73] Assignee: International Business Machines Corporation, Armonk, N.Y.

[21] Appl. No.: 587,897

[22] Filed: May 12, 1995

Related U.S. Application Data

[63] Continuation of Ser. No. 12,495, Feb. 2, 1993, abandoned.

[30] Foreign Application Priority Data

Aug. 14, 1992 [GB] United Kingdom ............... 9217278

[51] Int. Cl.$^6$ ...................................... H04M 1/26
[52] U.S. Cl. .................... 379/201; 379/350; 379/355
[58] Field of Search ................... 379/46, 112, 201, 379/202, 203, 205, 210, 211, 212, 214, 215, 258, 265, 355, 350

[56] References Cited

U.S. PATENT DOCUMENTS

| | | | |
|---|---|---|---|
| 4,739,509 | 4/1988 | Bourg | 379/112 |
| 4,748,656 | 5/1988 | Gibbs et al. | 379/96 X |
| 4,792,800 | 12/1988 | Fujioka et al. | 370/110.1 X |
| 4,835,769 | 5/1989 | Donaghue, Jr. et al. | 370/85 |
| 4,891,813 | 1/1990 | Salcedo et al. | 370/110.1 |
| 4,939,774 | 7/1990 | Sawada | 379/353 |
| 4,998,274 | 3/1991 | Ephraim | 379/158 |
| 5,204,861 | 4/1993 | Wiebe | 370/110.1 |
| 5,276,679 | 1/1994 | McKoy et al. | 370/100.1 |
| 5,291,492 | 3/1994 | Andrews et al. | 370/110.1 |
| 5,305,312 | 4/1994 | Fornek et al. | 370/110.1 X |
| 5,317,630 | 5/1994 | Feinberg et al. | 379/96 X |
| 5,333,133 | 7/1994 | Andrews et al. | 379/210 X |
| 5,436,962 | 7/1995 | Hirata | 379/212 |
| 5,459,788 | 10/1995 | Kim | 379/399 |
| 5,481,598 | 1/1996 | Bergler et al. | 379/96 X |
| 5,530,807 | 6/1996 | Baker et al. | 370/110.1 X |

OTHER PUBLICATIONS

"ICL Announces a Family of .OS/2 Based ISDN Systems", News Release, 4 Apr. 1989, p. 1.
"ISDN: Concepts, Facilities, and Services", Kessler, pp. 225–228, 230–231, 257–267, 1990.

*Primary Examiner*—Krista M. Zele
*Assistant Examiner*—Scott L. Weaver
*Attorney, Agent, or Firm*—Joscelyn G. Cockburn

[57] ABSTRACT

A communications device, connectable to a digital network, such as an ISDN, for setting up a voice call to a remote telephone via the network, the device comprising logic for sending a call signal to the network to establish a call via the network to a local telephone, characterized by call transfer logic for sending further signals to the network to transfer the established call to the remote telephone in response to a confirmation signal from the network indicating that the local telephone has been answered, thereby establishing a voice call between the local telephone and the remote telephone. In one embodiment the device is in the form of a communications adapter for a personal computer.

10 Claims, 4 Drawing Sheets

COMMUNICATIONS DEVICE TO ESTABLISH CALL IN ISDN SYSTEM

This application is a continuation of application Ser. No. 08/012,495, filed Feb. 2, 1993, abandoned.

BACKGROUND OF THE INVENTION

1) Field of the Invention

This invention relates to the setting up of voice calls by communications devices in a digital network.

2) Prior Art

One way of setting up voice calls over an Integrated Services Digital Network (ISDN) by a computer involves an ISDN adapter installed in the computer which has a port for connection to a specially-adapted telephone or headset which is dedicated for use with the particular adapter.

This arrangement has a number of problems associated with it.

First, the telephone, being dedicated for attachment to the ISDN adapter, cannot be used standalone to communicate over the network. Secondly, when the computer is powered off, so is the telephone. This is a problem in emergency situations where power is lost and telephone contact is required. Thirdly, system and application software is required for the telephone to operate. Such system software normally needs homologation and, if not designed correctly, could lead to the application software also requiring homologation. Fourthly, if a software problem is encountered the user might have to restart the computer before the telephone can be used again. In the worst case, if the computer suffers a hardware failure then the telephone is not available until after the computer is repaired.

SUMMARY OF THE INVENTION

It is the object of the invention to solve these problems.

Accordingly, one aspect of this invention provides a communications device, connectable to a digital network, for setting up a voice call to a remote telephone via the network, the device comprising logic for sending a call signal to the network to establish a call via the network to a local telephone, characterised by call transfer logic for sending further signals to the network to transfer the established call to the remote telephone in response to a confirmation signal from the network indicating that the local telephone has been answered, thereby establishing a voice call between the local telephone and the remote telephone.

In this way, a computer equipped with an ISDN adapter can be used as a communications device to set up voice calls from a conventional ISDN telephone, thus obviating the need for a dedicated telephone and allowing the local telephone and the controlling computer to operate independently thereby solving the above-mentioned problems of power failure and dependence on hardware and software reliability.

An embodiment of the invention uses an ISDN telephone and a personal computer having an ISDN adapter installed without the special port for telephone support. The ISDN telephone and the ISDN adapter can either be connected to the same passive bus, which has the advantages that the cost of two ISDN lines is avoided and the ISDN adapter can monitor incoming calls to the telephone, or they can have separate ISDN numbers.

The invention enables an application program in the computer to be used to make connections between the local ISDN telephone and remote telephones.

BRIEF DESCRIPTION OF THE DRAWINGS

An embodiment of the invention will now be described, by way of example only, with reference to the accompanying drawing, wherein.

DESCRIPTION OF THE PREFERRED EMBODIMENT

Figure 1:
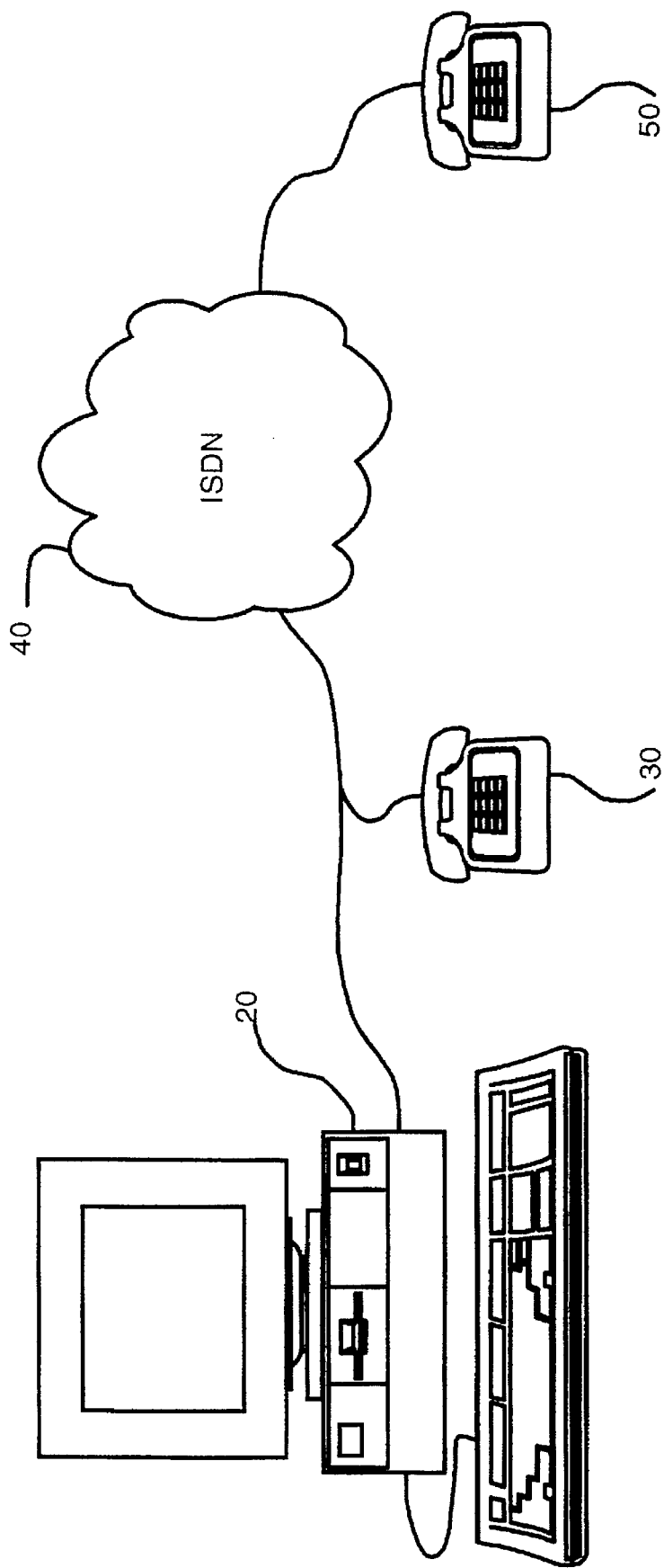
FIG. 1 is a schematic diagram showing the arrangement of computer, ISDN network and telephones in one embodiment of the invention.

This embodiment of the invention involves an ISDN telephone and a personal computer having an ISDN adapter arranged generally as shown in FIG. 1. Personal computer 20, which has a suitable ISDN adapter (not shown) installed, and local telephone 30 are connected via an ISDN passive bus to ISDN network 40 which also includes an ISDN switch. Remote telephone 50 is also connected elsewhere to the network 40.

Figure 3:
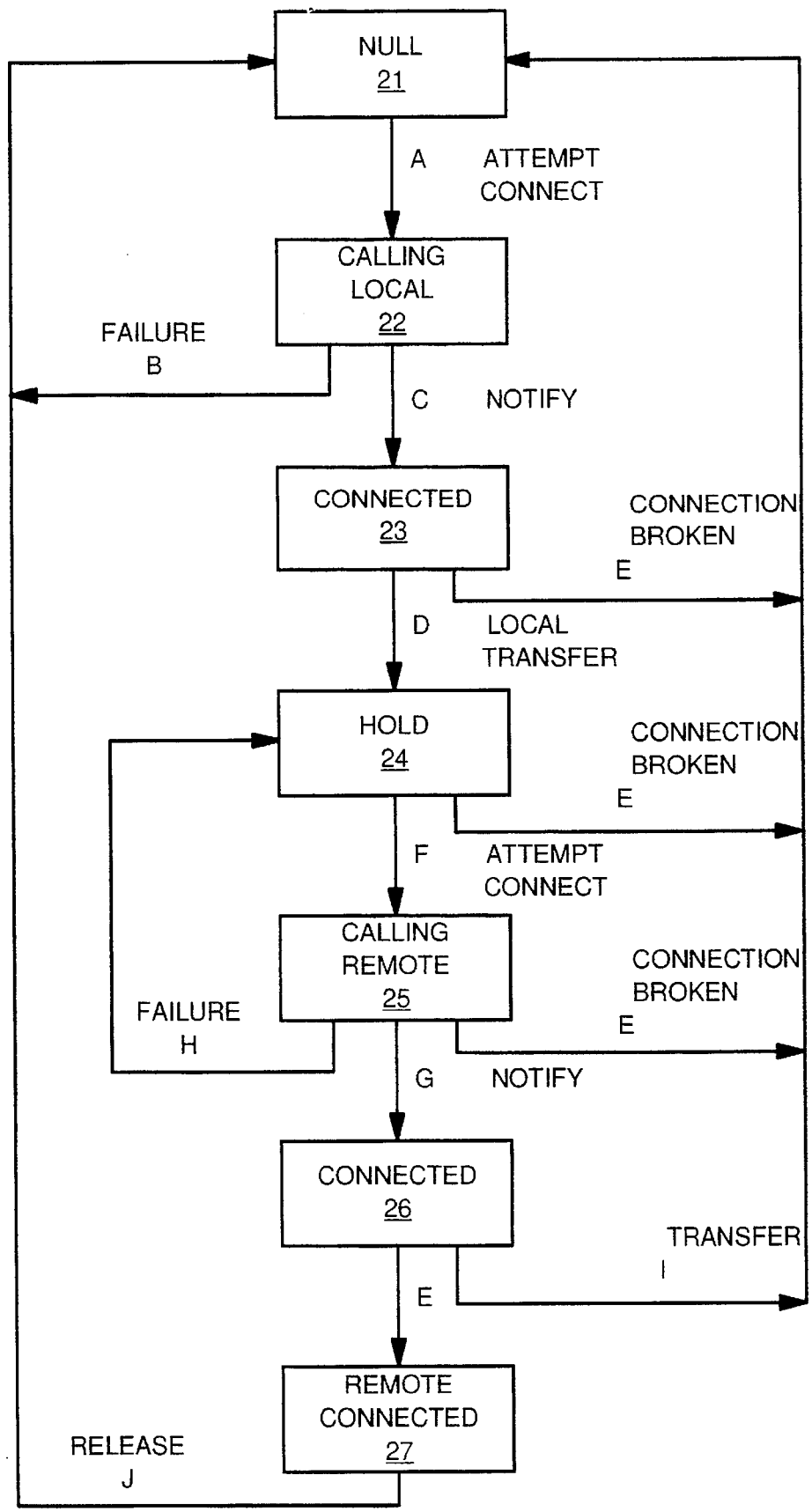
FIG. 3 is a state table for the computer.
Figure 4:
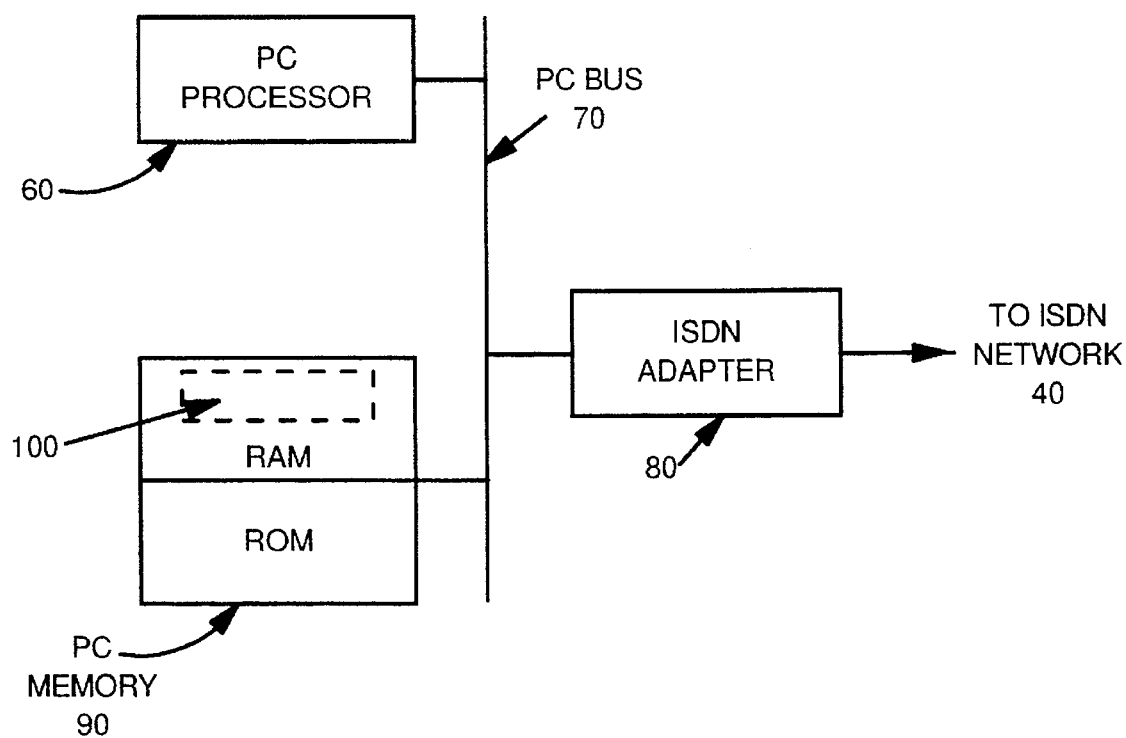
FIG. 4 is a schematic diagram of a Personal Computer (PC).

FIG. 4 shows a schematic of the Personal Computer 20 (FIG. 1). The Personal Computer includes PC bus 70 to which PC processor 60, ISDN adapter 80 and PC memory 90 are connected in a conventional sense. The output from ISDN adapter 80 goes to ISDN network 40. The PC memory 90 includes a RAM in which a directory of telephone numbers 100 is stored and a ROM which stores programs for controlling the PC processor 60. The state diagram, shown in FIG. 3, and described below is the logical flow chart of the program which controls the PC processor 60.

The call setting up process is initiated by the supply to the computer 20 of the number of the remote telephone. The number of the remote telephone is either supplied by direct user entry or by another method such as user selection of an entry in an application directory.

Figure 2:
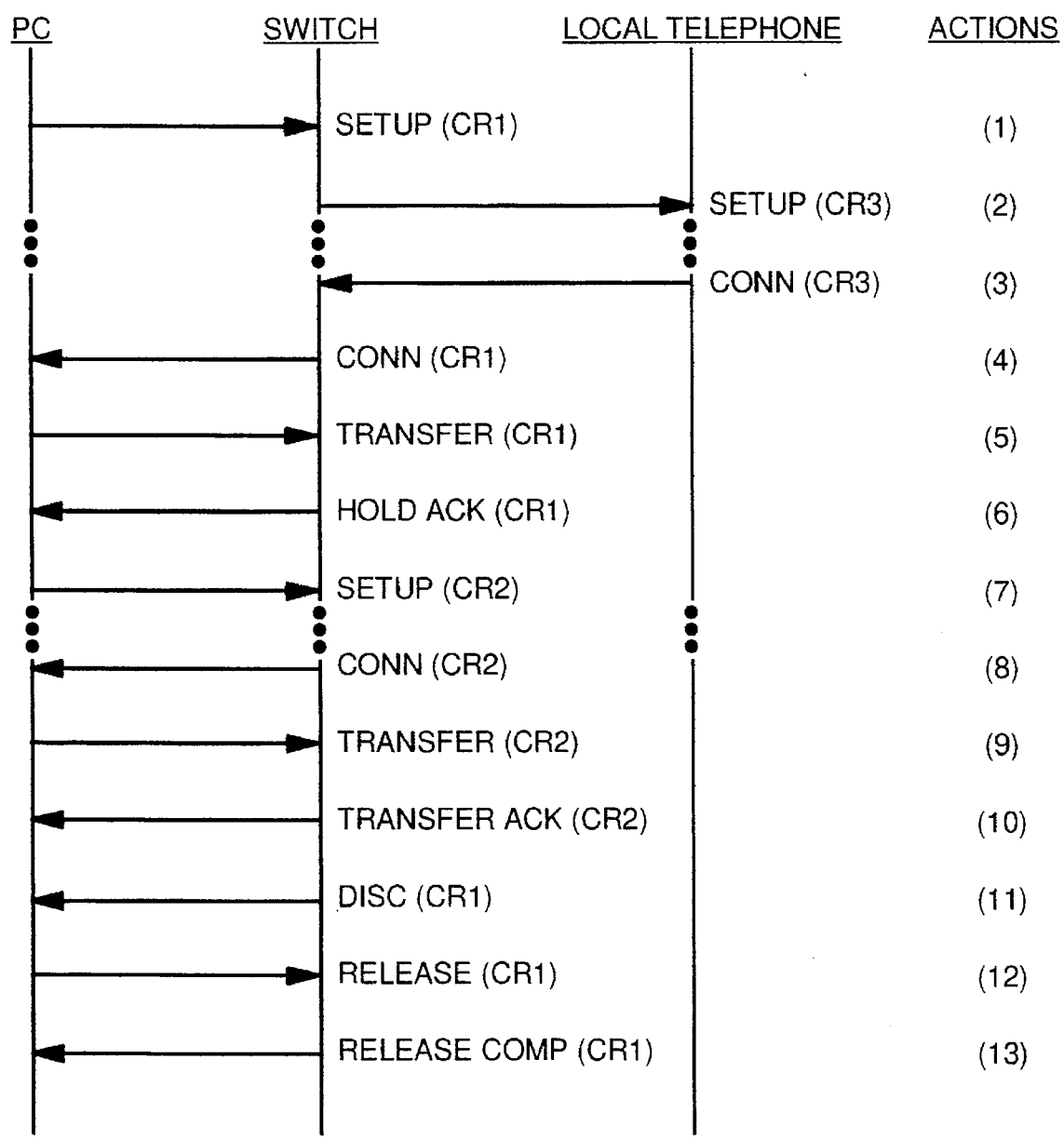
FIG. 2 shows the ISDN message flow between the computer, ISDN network and local telephone.

The procedure followed by the system is shown in FIG. 2 and is as follows. First the computer attempts connection to the local telephone 1, the number of which is stored in the system. The local telephone is sent 2 notification from the network of the connection request.

If the local telephone receives an external call prior to the call from the computer reaching it, i.e. between steps 1 and 2, then the computer indicates this to the user on its display, so that the user does not pick up the local telephone expecting connection to the remote telephone, when they are actually connected to an incoming call. It will be understood that other messages, such as ALERTING, may be exchanged before connection with the local telephone is established.

When the local telephone is answered by the user, it accepts connection 3 and the connection between the computer and the local telephone is complete 4.

In response to receiving confirmation that the call to the local telephone has been answered, the computer requests 5 transfer of the connection to the local telephone. The ISDN switch responds to the transfer request by placing the connection to the local telephone on hold 6. When this happens, the computer attempts 7 connection to remote telephone 50. During this phase other messages, such as ALERTING, may also be exchanged before connection with the remote telephone is established.

On receiving notification that the connection to the remote telephone is complete 8, the computer requests transfer of its connection to the remote telephone 9. When the transfer is acknowledged the local telephone and the remote telephone are connected 10. Finally, the computer removes 11, 12, 13 the unwanted call reference, which is no longer needed.

If a connection cannot be made to the remote telephone, the user can terminate the attempt to connect by replacing the local telephone receiver. The loss of connection to the local telephone will be indicated by ISDN messages to the computer, which will terminate its attempt to connect to the remote telephone. Alternatively the user could use the computer to terminate the attempt to connect to the remote telephone. This would allow him the option of attempting to connect to an alternative remote telephone while still keeping his call to the local telephone held, pending transfer.

FIG. 3 is a state table for the computer with the following states:

21 Null state;
22 Calling local telephone;
23 Connected to local telephone;
24 Local call transferred, placed on hold;
25 Calling remote telephone;
26 Connected to remote telephone;
27 Remote connection with no local connection,
and the following actions or indications:
A Attempt connection to local telephone;
B Failure to connect to local telephone;
C Notification of connection to local telephone;
D Local connection transferred;
E Local telephone receiver put down, connection broken;
F Attempt connection to remote telephone;
G Notification of connection to remote telephone;
H Failure to connect to remote telephone;
I Remote connection transferred;
J Release remote connection.

We claim:

1. A communications device for connecting to a digital network for setting up voice calls between a first telephone coupled to the digital network; and a second telephone coupled to the digital network; said communications device comprising: an ISDN passive bus for providing parallel signal paths into the digital network; a programmed computer including means for sending a call signal along one of the parallel signal paths to the digital network to establish a call along another one of the parallel signal paths to the first telephone, with said digital network returning a confirmation signal indicating that the first telephone has been answered and communicating over different ones of said parallel signal paths with the first telephone and the programmed computer;

means in said programmed computer for sending a request to the digital network to place a connection to the first telephone on hold;

means in the digital network for placing said connection on hold;

said programmed computer further including means for sending a call signal to the digital network to establish a call to the second telephone; and call transfer means in said programmed computer, being responsive to a notification signal from the digital network indicating the call to the second telephone is complete, for sending signals to the digital network to transfer the call established with the first telephone to the second telephone, thereby interconnecting the first telephone with the second telephone and establishing a voice call between the first telephone and the second telephone.

2. A communications device as claimed in claim 1 further comprising means in said programmed computer for sending a release signal to the digital network to release the communications device from the established call between the second telephone and the first telephone in response to an acknowledgement signal from the digital network indicating that transfer is completed.

3. The communications device as claimed in claim 1 wherein the call transfer means responds to a signal from the digital network indicating that the first telephone is busy and said digital network is terminating any attempt to connect to the first telephone, the communications device comprising means responsive to detection of the signal from the digital network indicting the first telephone is busy by the call transfer means for indicating to a user detection of said signal indicating the first telephone is busy.

4. A communications device as claimed in claim 1 wherein the call transfer means responds to a signal from the digital network indicating that a receiver of the first telephone has been placed in an on-hook state and said digital network is terminating any attempt to connect to the second telephone.

5. The communications device as claimed in claim 1 comprising a storage device for storing a directory of telephone numbers and means responsive to input operation by a user for enabling said user to select telephone numbers with which said user wishes to communicate via the ISDN passive bus and digital network, from the directory of stored telephone numbers.

6. A communications device as claimed in claim 1 including a storage device for storing the number of the first telephone.

7. A communications device as claimed in claim 1 wherein the first telephone and the second telephone includes ISDN telephones.

8. The communications device as claimed in claim 1 wherein the programmed computer includes a processor mounted on an adapter card.

9. A communications system for connecting to a digital network and for setting up voice calls via said digital network; said communications system comprising:

a first telephone coupled to the digital network;

a second telephone coupled to the digital network;

logic in a computer for sending a call signal to said digital network to establish a call via the digital network to the first telephone; said digital network returning a confirmation signal to said logic indicating the first telephone has been answered;

in response to a request from said computer to place on hold a connection between said digital network and said first telephone, said digital network placing the connection to the first telephone on hold;

logic in said computer for sending a call signal to said digital network to establish a call to the second telephone; and call transfer logic in said computer, responsive to a notification signal from the network indicating the call to the second telephone is complete, for sending signal to the digital network to transfer the call established with the first telephone to the second telephone thereby establishing a voice call between the first telephone and the second telephone; and an ISDN bus for providing parallel signal paths into the digital network coupling said computer to the digital network.

10. In a communications network including an Integrated Service Digital Network (ISDN), a computer with an ISDN adapter for communicating with said ISDN, a first telephone coupled to the ISDN and a second telephone coupled to the ISDN, a method for setting up a voice call between the first telephone and the second telephone comprising the steps of:

(a) sending, from said computer, a first call signal to said ISDN to establish a call via the ISDN to the first telephone; said ISDN returning a confirmation signal to said computer indicating the first telephone has answered;

(b) sending from said computer to the ISDN a first request that the ISDN place a connection to the first telephone on hold;

(c) in response to step (b) said ISDN placing said connection on hold;

(d) sending, from said computer, a second call signal to said ISDN to establish a call to the second telephone;

(e) sending, from the ISDN to the computer, a notification signal that a connection has been established with the second telephone; and (f) sending from the computer to the ISDN, a second request to transfer the call established with the first telephone to the second telephone therein establishing the voice call between the first telephone and the second telephone.

* * * * *